April 6, 1937.  W. DUBILIER  2,075,891
ELECTRIC CONDENSER
Filed May 24, 1934  2 Sheets-Sheet 1
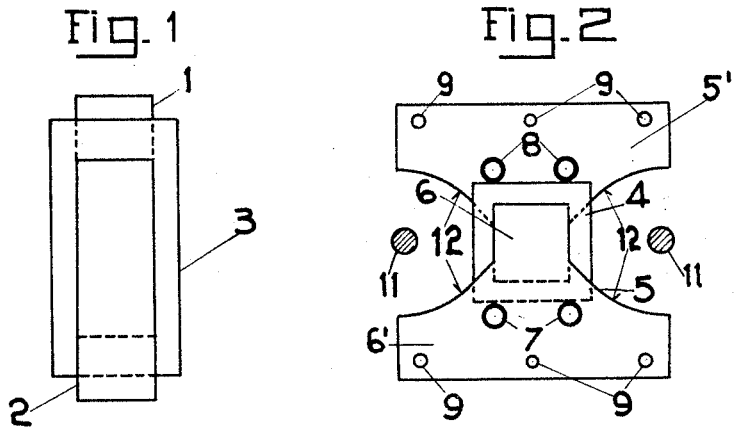
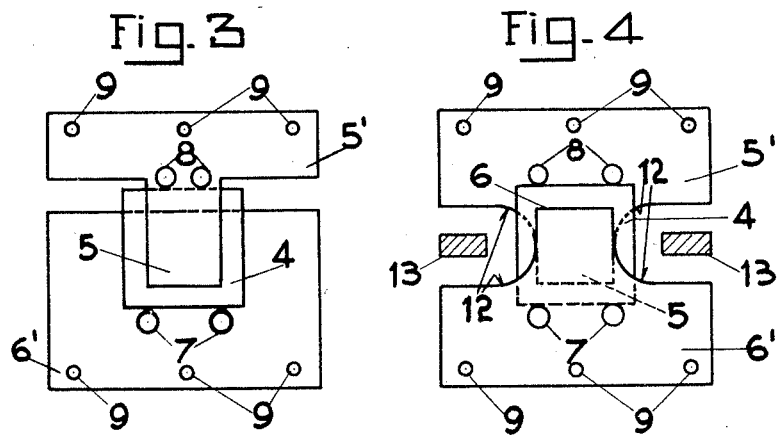
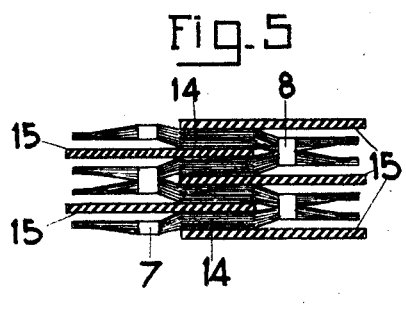
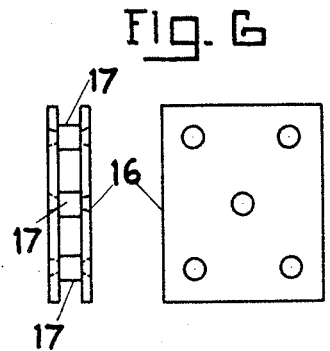
INVENTOR
William Dubilier
BY
ATTORNEY April 6, 1937. W. DUBILIER 2,075,891
ELECTRIC CONDENSER
Filed May 24, 1934 2 Sheets-Sheet 2
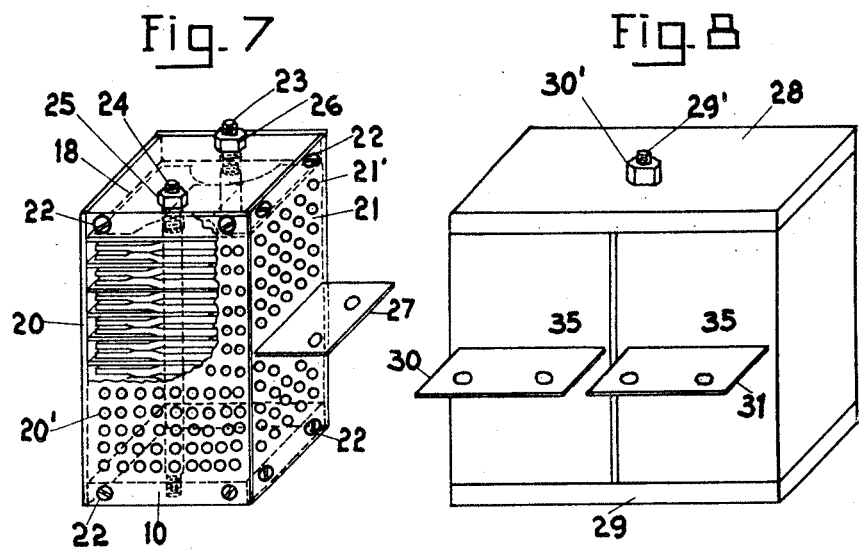
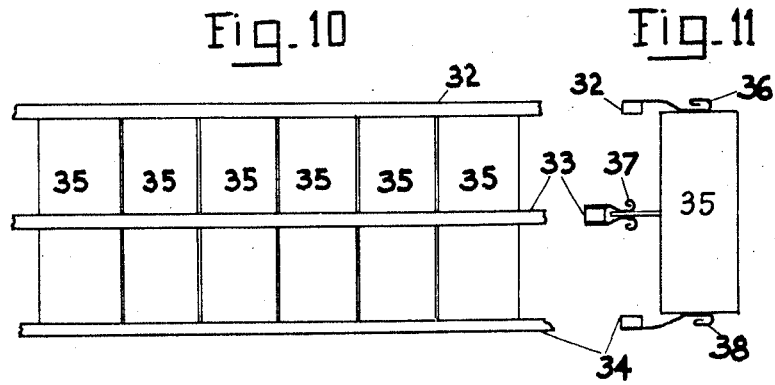
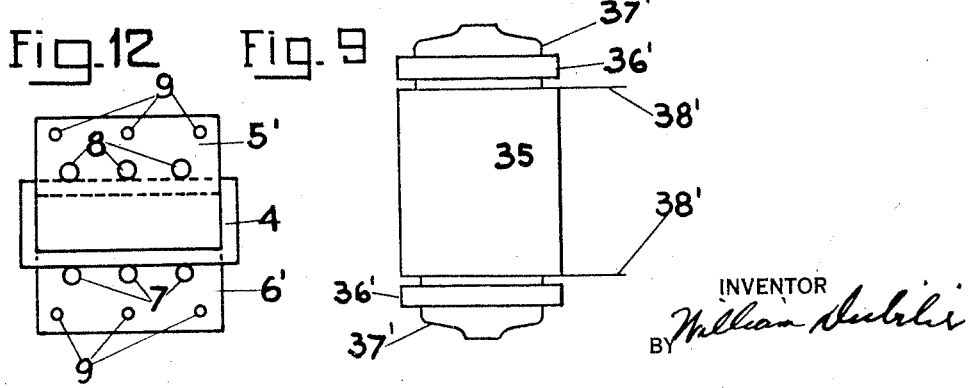
INVENTOR
William Dubilier
BY
ATTORNEY Patented Apr. 6, 1937

2,075,891

UNITED STATES PATENT OFFICE 2,075,891

ELECTRIC CONDENSER

William Dubilier, New Rochelle, N. Y., assignor to Cornell-Dubilier Corporation, New York, N. Y., a corporation of New York Application May 24, 1934, Serial No. 727,237

14 Claims. (Cl. 175—41)

This invention relates to electric condensers, especially those which are adapted for power purposes to carry substantial current values as compared to condensers for use in receiving sets or those used across high voltages with minute current values. Where substantial currents must be passed through the condensers, as for example when used in high frequency circuits, the heavy currents passing through the condenser will generate heat within the condenser unit itself for well known reasons.

This increase in heat or losses within the condenser unit will cause deterioration, breakdowns and other known inefficiencies.

One of the objects of this invention is to eliminate to a substantial extent these disadvantages and defects. It will be seen later that by my improved condenser I can decrease the operating temperature of a condenser with a given value of current or I may increase the current through a definite fixed unit without substantially increasing the temperature rises of the unit.

By these improvements, an improved construction, especially for high tension condensers, is obtained, enabling a unit to be used on heavy duties both as to potentials, and/or amperage, and frequency. At the same time a simplified and less expensive structure results by easy stacking and assembly, a simplified method of connecting sections together, large improvement by decreasing the $I^2R$ losses or ohmic losses in the electrodes themselves for a given electrode length.

By this invention I am able to make condensers with dielectrics which are not entirely perfect and which results in slightly more losses due to these imperfections, but such losses do not damage the operation of the condenser under given conditions, as was the result with previously known constructions. It is evident that by increasing the power applied to a given square surface of active capacity, I can build condensers at greatly reduced costs. This new structure also provides for a rapid dissipation of heat generated within the condenser unit giving increased electrical efficiency for a given size and capacity as compared to condensers heretofore used in the art.

A more specific object of my invention is the provision of a novel condenser structure comprising interleaved conductive and dielectric sheets characterized by an increase of the comparative admissible losses per unit of active surface area, enabling a substantial reduction of size and bulk of the active condenser unit for a given capacity as compared with similar condensers heretofore used in the art.

Still a further object of my invention is the provision of a novel construction for high duty electrical condensers comprising interleaved conductive and dielectric sheets by which a greater amount of energy may be applied per active surface area of the dielectric sheets to afford greater losses without increasing the ultimate heat rise of the condenser in such a manner as to substantially increase the electrical efficiency of the condenser.

Another object of the invention is the provision of simple means for assembling condensers into stacks.

Still another object of the invention is the provision of an electrical condenser in which foils extend beyond the condenser to provide sufficient heat radiating surface and act as protection for the condenser.

These and further objects as well as aspects of the invention will be better understood from the following description taken with reference to the accompanying drawings wherein I have shown some forms of condenser design in accordance with my invention. As will become obvious, various modifications are possible coming within the broader scope and spirit of the invention, and accordingly I do not wish to be limited to the specific constructions as illustrated.

In the drawings, wherein similar reference numerals identify similar parts throughout;

Figure 1 shows the assembly of conductive and dielectric sheets in accordance with present known practice in electrical condenser construction of the layer type.

Figure 2 illustrates one way of practicing the invention showing the arrangement of the interleaved conductive and dielectric sheets.

Figures 3 and 4 are modifications of condenser design in accordance with the invention.

Figure 5 illustrates a cross-section of a condenser comprising a plurality of individual sections.

Figure 6 illustrates a spacing member to be used between the sections in a stack as shown by Figure 5.

Figure 7 shows a condenser construction comprising a stack of condenser sections according to the invention provided with a clamp and casing arrangement, with a part of the casing being broken away.

Figure 8 shows another arrangement using a single clamp for two condensers constructed in accordance with the invention.

Figure 9 schematically indicates another clamping arrangement for a condenser according to the invention.

Figures 10 and 11 show front and side views of a mounting arrangement for easy connection and disconnection of a desired number of condensers in an electrical circuit to obtain a desired resultant capacity.

Figure 12 shows another example of carrying out the invention by using comparatively long and narrow sheets and having the foil projecting along the long side with connections made at the points or holes shown in a similar manner as that described for the other figures.

In the former construction of mica condensers, especially for heavy currents and high voltages, sheets of foil 1 and 2 are placed between sheets of mica 3 on alternate sides in the well known manner and as shown in Figure 1 of the drawings. The mica was usually about 2 inches x 2 inches or 1½ inches x 2 inches and the foil with about ¼ inch spacing around making it ½ inch narrower than the mica. The ends were soldered and usually projected about ¼ inch to ⅜ inch beyond the mica where they were soldered from section to section. In a condenser to operate at about 100 kva. high frequency, it has been the practice to use approximately from 1200 to 1500 sheets of mica either 1½ x 2 or 2 x 2 inches.

Practice required that the heat rise in this condenser be kept to below about 20 watts; a heat rise above that amount would cause excessive heating and losses of the condenser, one of the reasons being that the losses in the dielectric material and the life of the condenser were somewhat governed by the temperature, so that an increase in temperature caused an increase in power factor or losses in the mica which in time caused greater losses and greater temperature increase etc., in successive cycles, ultimately resulting in a breakdown of the condenser. It was therefore necessary that the temperature rise be kept extremely low or within a certain level. The losses per sheet could be reduced by decreasing the kva. per sheet, but this results in rapidly increasing costs and size, and since the greater costs in a condenser are usually the dielectric material, with this improvement of the invention, cost of the expensive dielectric material can be reduced and the cost of the container or surrounding medium of the condenser unit increased, the former being substantial as compared with the latter.

Some of the causes of the losses are due to the increased operating temperature, hysteresis or other losses in the dielectric material and I²R or ohmic losses in the electrodes. The improved design according to my invention is such as to greatly reduce these losses and to quickly prevent any possible accumulation or storage of heat within the condenser unit proper or active dielectric area. It also greatly reduces the ohmic losses, which are important and which may form a substantial part of the total losses of the condenser. The novel design according to the invention gives a simple structure less costly than that used at present, a simple means for assembling the unit and a rapid means for getting rid of heat generated, which although comparatively small, is extremely important and essential in the practical operation of the condenser, as pointed out herein.

The importance of some of these features can be realized by referring to the figure cited above, wherein in a 100 kva. condenser unit of say 1200 sheets of mica there is a permissible loss of 20 watts; that is, slightly less than 0.02 watt per sheet. Losses higher than this small fraction are not acceptable in many specifications and installations. It therefore can be seen that small amounts of energy loss are serious in designing efficient condensers.

The improvement according to my invention is such that the comparative losses per active surface area can be greatly increased without these dangers, still being extremely small for practical purposes and making the condenser much smaller in size and greatly reduced in cost.

Although the actual loss for a given kva. rating is extremely low, the efficiency of the condenser during operation is of secondary importance for power purposes. The actual losses may be many times as high and still the condenser will be considered extremely efficient. But these losses concentrated in a small volume generate heat and cause other deteriorations which are dangerous to the safety of operation by rapidly deteriorating the dielectric and resulting in short life and other well known disadvantages. A well accepted serious defect in condenser structure is excessive temperature rise within the active dielectric surface which is greatly eliminated by the improvements as set forth herein.

Figure 1, as pointed out, shows the well known commonly used methods of building condenser units at present in which numerals 1 and 2 represent the conductive sheets, such as metal foils, and numeral 3 represents the dielectric, such as mica, in accordance with the well known practice heretofore followed in condenser manufacture. It can be seen that the heat which is generated in the center of the active surface must be conducted at a considerable distance to the outside before it can be transferred to the surrounding media which may be wax, oil, air or any other suitable medium. It is furthermore seen that there is only a small surface area in contact with the surrounding media into which the heat is transferred.

In accordance with the novel design and construction according to the invention, I use much smaller sheets of mica and very much larger sheets of foil, somewhat as shown in Figure 2, whereby the defects and disadvantages inherent in condensers of the hitherto known type as indicated in Figure 1, are overcome.

I have shown in Figure 2 a first set of metallic sheets and a second set of sheets with interposed dielectric sheets, such as mica shown at 4. The overlapping surfaces of the metallic sheets comprise an active surface 5 and 6 and a radiating surface shown at 5' and 6', respectively, and alternately projecting at opposite sides of the mica sheets, as shown. In this manner the heat generated in the interior of the condenser has a small distance to travel from the center of the active surface to the contact area of the radiating surface and a large contact surface to the radiating media surrounding the condenser is obtained. Besides, the ohmic loss is greatly reduced due to the shorter distance and larger cross-sectional area of the foils and other obvious features as shown herein. The radiating surfaces 5' and 6' may be connected together at their edges by means of rivets or soldered as shown at 9, or any other well known method. I have furthermore shown holes 7 and 8 through the radiating portions 5' and 6' of the conductive sheets or foil adjoining the mica sheets between the active surface and the radiating surface of the foil which may serve as an assembling means for properly aligning the sheets during the manufacture by means of a suitable assembly jig, and at the same time the holes, through which the parallel sheets are soldered together and the sections soldered to each other for connecting individual sections in series or in parallel as more fully shown in Figure 5. For illustrative purposes, connection points 7 and 8 in Figure 5 are shown somewhat removed from the mica sheets, but in practice they actually are as close to the mica sheets as possible and as practical mechanical structure will allow and actually are in positions 7 and 8 as shown on Figure 2 or 4. By making the current connections as close to the active surface area as possible, as for example by soldering or connecting the parallel sheets together and the sections to each other through the holes 7 and 8 and along the edges as indicated at 12 in Figures 2 and 4, the further advantage is gained in that the current passes to the active element portions at the points nearest to the active surface and at a plurality of places, dividing the current paths over a larger area and for a shorter distance, thus greatly reducing the ohmic losses. I have found that by using conductive sheets having an extending radiating surface of about 25% of the active dielectric surface and more, improved results can be obtained in accordance with the invention, but that for optimum heat radiating conditions, larger minimum extending radiating surface areas may be required, such as more than 35%, 50%, or 100% of the active surface area, dependent on the construction and design as well as the use and operating conditions to which the condenser is to be put.

Referring to Figures 3 and 4, I have shown modified designs of the metal sheets or the radiating extension surfaces thereof, respectively, being of substantial rectangular shape whereby a minimum possible foil area and cooling area is obtained for a given mounting space or size of the condenser.

After the condenser sections have been assembled, a plurality of sections may be stacked upon each other in a well known manner with suitable separators arranged between the sections and the sections compressed by means of a clamp. The latter may consist of, according to known constructions, resilient pressure members or the like placed at the bottom or top of the condenser and held together by means of bolts 11 (Fig. 2) or rectangular clamping members 13 (Fig. 4) and arranged in the space of the cutout portions of the projecting surface of the conductive sheets as shown.

For condensers according to the invention as described before, instead of using a sheet of mica 2 inches x 2½ inches, a mica sheet about 1⅛ inches square may be used, and, instead of having the foil 2¼ inches long, the foil is about 2 inches long, but the current travels only about 1 inch and the foil is about 3 inches wide for a considerable proportion of its length. Especially favorable conditions are obtained with a design as shown in Figure 12 where the sheets are comparatively long and narrow and where the foils project along the long side and the current and the heat have but a short distance to travel to the comparatively large exposed radiating surface and where the connections between the sheets and between the sections in all cases are as close to the mica as possible and not necessarily at the end of the projecting foil, as has heretofore been the practice. Thus the actual resistance for a given current for a single sheet is greatly reduced, further reducing the losses. The contacts between the sections are made through two or more holes as shown at 7 and 8 in the figures, through which the sections are electrically connected by soldering or other convenient methods. These holes may also be used for properly aligning the electrode sheets during the assembling of the condenser section by means of a suitable assembly arrangement.

Thus it is evident that I can apply a greater amount of energy per active surface area and afford greater losses without a greater ultimate heat rise within the unit. From actual tests I have found that where I required one pound of mica for a given kva. unit, I can use a much smaller quantity of mica for the same kva. rating of the condenser without a greater ultimate heat rise.

Referring to Figure 5, this illustrates a condenser stack according to the invention comprising a number of sections 14 each consisting of a plurality of interleaved conductive and dielectric sheets as shown in Figures 2 to 4. The sections are separated from each other by means of insulating separators 15 extending alternately at opposite sides of the condenser body as shown. I have furthermore shown the adjacent radiating surfaces of the condenser sheets between successive separators 15 electrically connected by a filling of the holes 7 or 8, respectively, with solder or otherwise connected together, thus connecting the section in series to adapt the condenser for use under high tension. The insulated separating plates 15 must extend near, and preferably beyond, the ends of the metallic sheets, as shown. The extending radiating foil portions are further shown to be spread out to allow active cooling by the surrounding cooling medium, such as insulating oil, wax, air and the like. Alternatively, I may place between the sections an open spacer consisting of two flat sheets 16, as shown in Figure 6, of metal held apart by spacers 17 which may still further facilitate the radiation of heat from the active dielectric surface.

While I have shown a convenient method of carrying out the invention, other mechanical structures are possible to carry out the same invention. It is to be noted that the heat generated in each dielectric sheet is quickly conducted from the sheet, thus avoiding the necessity for this heat being transferred to the adjoining sheets and accumulating between the sheets before it can reach the large flat surfaces of the section. It is not essential to place heavy sheets of metal compared to the thickness of the foil between the sections in order to radiate the heat. These sections, when connected together in series for a stack, can be separated by insulating pieces and the unit properly clamped and assembled, as will be described in more detail hereinafter. The ends of the clamp may be of heavy pieces of metal, not only covering the active area of the section, but extending out to the ends or beyond the projecting foils and across these ends may be mounted a closure for the condenser unit. This closure may be perforated to allow free circulation of cooling media, but the closure is not essential as the metal ends and the insulating spaces may project beyond the foil on all sides and act as a protection against mechanical or other injuries through the projecting foils.

Referring now to Figure 7, I have shown a stack comprising a plurality of condenser sections in accordance with the invention, such as shown by Figure 5 with end pressure plates 10 and 18 placed at each end of the stack and held under compression by suitable means such as the threaded bolts 23 and 24 and nuts 25 and 26.

While a condenser or stack of condenser sections, respectively, thus assembled and clamped may be used directly in an electrical apparatus, whereby the extending foil portions provide sufficient protection of the active condenser body proper, as is well understood, the condenser may also be mounted in either an insulating casing or a metal container as may be desired. In the arrangement according to Figure 7 I have shown the condenser surrounded by walls of insulating material 20 and 21 provided with openings 20' and 21' and fastened on to the pressure plates 18 and 10 such as by means of screws 22 as shown. Similar walls are connected to the remaining sides of the condenser, thus making an all enclosed casing which may be either used directly in air or may be immersed in a bath of insulating liquid such as oil and the like, whereby the holes 20' and 21' serve to allow the surrounding cooling medium to enter into the interior of the condenser for effective heat transfer and cooling the condenser. I have furthermore shown a center terminal lug 27 protruding from the condenser body at right angles for connecting the condenser in an electrical circuit.

Referring to Figure 8, this illustrates schematically another way of mounting a condenser according to the invention comprising a single bolt for clamping a pair of condenser stacks 35 similar as described in Figure 7 by means of a pair of common pressure plates 28 and 29 and a bolt 29' and nut 30'. The central terminal lugs of the condensers are shown at 30 and 31, similar as in Figure 7. The remaining end terminals of the condensers shown by Figures 7 and 8 are either connected to ground or joined to serve as the second terminal of the condenser with the lugs 27, 30 and 31 acting as the other condenser terminal in accordance with well established practice.

In an alternative arrangement as shown by Figure 9, insulating blocks may be provided at both ends of the condenser stack 35 with pressure or clamp members 37' as shown, whereby both ends of the condenser unit may be used as terminals with an insulating clamp holding the stack under compression, blocks 36' being of insulating material and 38' the high tension terminals. The condenser unit, after assembly in the plant as shown in Figures 7 or 8 or any other well known manner, may then be mounted in a rack or on an insulator as shown for instance in Figures 10 and 11.

If the condenser is mounted in a container which may be of metal, provisions are made for circulation of the air through the container by the arrangement of a number of openings in the container allowing free circulation of air. It is advisable to cover the openings by a fine metal mesh in order to prevent the accumulation of dust in the unit. If the condenser is mounted in a container filled with an insulating compound, such as oil and the like, sufficient insulation is provided between the high tension and low tension ends of the condenser, but due to the construction of the condenser in accordance with the invention, the generated heat will be quickly conducted through the insulating compound to the container. Preferably the latter is provided with means for quickly radiating the heat with sufficient rapidity to the surrounding space so that within a short time the heat radiated from the container is substantially equal to the heat generated within the condenser due to electrical losses. Hence temperature rise of the container is both smaller and will reach a maximum in a much shorter time than has heretofore been possible. As is understood, a condenser unit as described by the invention adapts itself to any convenient way of mounting, as shown by numerous patents and pending applications of the applicant.

Referring to Figures 10 and 11, this illustrates an easy and simple way of connecting a desired number of condenser units, such as shown by Figure 7 in a rack or any other mounting arrangement for obtaining a desired capacity. For this purpose I have shown three bus bars 32, 33 and 34 provided with suitable switches such as spring or knife switches shown at 36, 37 and 38 engaging with the condenser end terminals and the central terminals as shown in the drawings. In this manner, any desired number of condensers may be connected or disconnected in parallel without soldering or similar operations for increasing or decreasing the resultant capacity between the bus bars, as is well understood.

The principle of the invention may be applied to almost any type of condenser structure. For example, in the rolled paper type where heat problems or energy losses are serious, the width of the paper may be small and the width of the projecting foil much larger than that used at present. The projecting foil upon the paper that, for example, may be approximately 2 to 2½ inches wide, may project approximately 1 inch or more beyond the paper. Or in electrolytic condensers, provisions can be made for the exposed radiating surface to be extremely large as compared to the exposed active surface or the volume of the active condenser unit.

The construction according to my invention provides a condenser unit which is less expensive and easier to manufacture and more efficient in operation, and in order to prevent excessive heat rise of the container in which the condenser is mounted, the latter can be made large enough wherever space is available and a small unit placed in a comparatively large container with a filling compound, preferably of the liquid type such as oil and the like.

I claim:

1. An electrical condenser comprising a plurality of interleaved conductive and dielectric sheets, the conductive sheets having a substantially larger surface area than the dielectric sheets and alternately projecting at opposite sides of the dielectric sheets to an extent substantially greater than required for making electrical connection between the sheets of like polarity, means for electrically connecting the extending portions of the conductive sheets close to and along the edge of the dielectric sheets, and further means for uniting the projecting portions of the conductive sheets to form rigid, self-supporting cooling members extending outwardly from the condenser body.

2. An electrical condenser comprising a plurality of interleaved flexible conductive sheets and dielectric elements, the conductive sheets having substantially a larger surface area than the dielectric sheets and projecting alternately at different sides of the dielectric sheets, the projecting sheet portions being provided with aligned perforations closely adjoining the edge of the dielectric sheets, a conductor arranged in said perforations for electrically connecting the conductive sheets of like polarity, the projecting portions of the conducting sheets having their outer edges united to form rigid, self-supporting cooling members extending from the condenser body.

3. An electrical condenser comprising a plurality of interleaved flexible conductive sheets and dielectric elements, the conductive sheets having substantially a larger surface area than the dielectric sheets and projecting alternately at different sides of the dielectric sheets to an extent substantially in excess of that required for effecting electrical connections of the projecting sheet portions of like polarity, the projecting sheet portions of said conductive sheet having aligned perforations closely adjoining the edge of the dielectric sheets, a filling of solder within said perforations for electrically connecting the sheets of like polarity, and means for uniting the outer edges of the projecting sheet portions to form rigid, self-supporting cooling members extending from the condenser body.

4. An electrical condenser comprising interleaved sheets of conductive and dielectric material, one portion of the conductive sheets overlapping the dielectric sheets and the remaining portion projecting beyond the dielectric sheets alternately at different sides thereof and to an extent substantially in excess of that required for effecting electrical connection of the projecting sheet portions of equal polarity, means for uniting the projecting conductive sheet portions to form self-supporting cooling members for the condenser, and electric connecting means for the projecting sheet portions of like polarity arranged close to the edge of said dielectric sheets.

5. An electrical condenser comprising a plurality of conductive sheets separated by dielectric sheets, terminal connections made at places of the conductive sheets dividing the conductive sheets into two portions, one portion being in contact with the dielectric sheets and serving as the active condenser electrode and the other portion projecting beyond the active electrode surface, and means for uniting the projecting conductive sheet portions to form self-supporting cooling members projecting from the condenser.

6. An electric condenser as claimed in claim 4, in which the extending surface of the conductive sheets has an area of 25% and more of the active portion overlapping the dielectric sheets.

7. An electric condenser comprising a stack of interleaved flexible conductive sheets and dielectric elements, the conductive sheets alternately projecting at opposite sides of the dielectric sheets, the projecting portions of the conductive sheets of like polarity being electrically connected together at points located at a substantial distance from the outer extending edges thereof, and means for uniting the outer edges of said conductive sheets of like polarity to form self-supporting cooling members projecting from the condenser stack.

8. An electrical condenser comprising a stack of interleaved flexible conductive sheets and dielectric elements, the conductive sheets alternately projecting at opposite sides of the dielectric sheets, the extending portions of the conductive sheets being electrically connected together at points located at a substantial distance from the outer edges thereof and adjoining the edges of the dielectric sheets, and means for uniting the outer edges of said conductive sheets to form self-supporting cooling members projecting from the condenser stack.

9. An electrical condenser comprising a stack of interleaved flexible conductive sheets and dielectric elements, the conductive sheets having substantially two integral portions, one portion overlapping the dielectric sheets and serving as active electrode area and the remaining portion projecting beyond the dielectric sheets alternately at different sides thereof and to an extent substantially in excess of that required for effecting electrical connection of the sheets of like polarity, means for uniting the outer edges of the projecting sheet portions to form rigid, cooling members extending outwardly from the condenser stack, the extending sheet portions having recesses, and a clamping member for the condenser stack arranged within said recesses.

10. An electrical condenser comprising a stack of condenser sections, each section consisting of a plurality of interleaved conductive and dielectric sheets, the conductive sheets within the sections being larger than the dielectric sheets and projecting alternately at opposite sides of the dielectric sheets, means for uniting the outer edges of the projecting sheet portions to form self-supporting cooling members extending from the condenser body, and insulating spacers between the sections of said stack projecting beyond the outer edges of the projecting conductive sheet portions, the extending portions of the conductive sheets being provided with holes close to and along the edge of the dielectric sheets, coinciding holes of adjacent sections being filled with solder for electrically connecting the sections.

11. An electrical condenser comprising a stack of condenser sections, each section consisting of a plurality of interleaved conductive and dielectric sheets, the conductive sheets being larger than the dielectric sheets and projecting alternately at opposite sides of the dielectric sheets to provide an increased projecting contact area to the surrounding medium of the condenser, insulating separators arranged between the sections, the projecting portions of the sections being provided with holes close to and along the edge of the dielectric sheets and a filling of solder connecting coinciding holes of adjacent sections, end pressure blocks placed at the ends of said stack and walls of insulating material provided with perforations fastened to said blocks to provide an enclosure for the condenser structure.

12. An electrical condenser comprising a stack of interleaved flexible conductive sheets and dielectric elements, the conductive sheets comprising substantially two integral portions of different widths, the dielectric sheets being interleaved with and overlapping the portions of smaller width of said conductive sheets, the portions of larger width of the conductive sheets extending beyond the dielectric sheets alternately at different sides thereof, means for electrically connecting the conducting sheet portions at a place closely adjacent the dielectric sheets, and further means for uniting the outer edges of the projecting conductive sheet portions to form self-supporting cooling members extending outwardly from the condenser stack.

13. An electrical condenser structure comprising a stack of condenser sections each section comprising a plurality of interleaved sheets of conductive and dielectric material, the conductive sheets being larger than the dielectric sheets and projecting alternately at opposite sides of the dielectric sheets to provide increased projecting contact area of the surrounding medium of the condenser, insulating separators arranged between the sections, means for electrically connecting the projecting portions close to and along the edge of the dielectric sheets, pressure members placed at the ends of said stack, and perforated walls of insulating material secured to said members to provide an enclosure for the condenser.

14. An electrical condenser comprising a plurality of conductive sheets separated by dielectric sheets, terminal connections made at places of the conductive sheets dividing the conductive sheets into two portions, one portion being in contact with the dielectric sheets and serving as the active condenser electrode and the other portion projecting beyond the active electrode surface, and means for uniting the projecting conductive sheet portions to form cooling members projecting from the condenser.

WILLIAM DUBILIER.